Patented June 8, 1937

2,083,482

UNITED STATES PATENT OFFICE 2,083,482

CARBOCYCLIC COMPOUNDS CONTAINING ACID SALT-FORMING GROUPS

Adolf Steindorff, Gerhard Balle, and Paul Heimke, Frankfort-on-the-Main, and Karl Horst, Hofheim-on-the-Taunus, Germany, assignors to I. G. Farbenindustrie Aktiengesellschaft, Frankfort-on-the-Main, Germany No Drawing. Application November 20, 1935, Serial No. 50,788. In Germany November 22, 1934

6 Claims. (Cl. 260—108)

The present invention relates to carbocyclic compounds containing acid salt-forming groups.

We have found that organic compounds having an acid character are obtainable by introducing into the hydroxyl group of an aromatic or hydroaromatic hydroxy-compound which contains as a substituent in the nucleus at least one aliphatic radical with more than 3 carbon atoms, an aliphatic radical which contains an acid salt-forming group, and whose carbon chain is interrupted at least once by oxygen, nitrogen, sulfur or the like.

The new compounds correspond with the general formula:

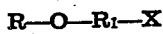

R—O—R₁—X wherein R means an aromatic or hydroaromatic radical containing as a substituent at least one aliphatic or aliphatic-aromatic radical with more than 3 carbon atoms and which may contain another substituent, R₁ means an aliphatic radical the carbon chain of which is interrupted at least once by oxygen, nitrogen, sulfur or the like, and X means an acid salt-forming group.

In the form of their water-soluble salts the new bodies are for the greatest part nearly colorless powders or viscous masses which are more or less easily soluble in water according to their molecular weight and composition.

The free acids are in part crystalline bodies, in part oily liquids or viscous masses; some of them are soluble in water as, for instance, the sulfonic acids, and glycolic ether carboxylic acids, others are insoluble in water.

The new compounds may be made as follows:

In order to introduce the aliphatic radicals in question —R₁—X into alkylated phenols or alkylated hydroaromatic hydroxy compounds there may be used the corresponding ready-made aliphatic bodies, that is to say an alkylated phenol or an alkylated hydroaromatic hydroxy-compound is caused to react with, for instance, beta-chlordiethylether-beta'-sulfonic acid; alternatively, a suitable aliphatic radical may be first introduced into the aromatic or hydroaromatic hydroxy-compound by a single reaction or by several reactions and then the acid salt-forming group is introduced.

As parent material for the manufacture of the new compounds there may be used as alkylated aromatic hydroxy-compounds: para-n-butylphenol, amylcresol. di-iso-butylphenol, isohexylnaphthol, oleylphenol, isododecylphenol, iso-octyl-resorcinol and the like; as alkylated hydroaromatic hydroxy-compounds, for instance: di-iso-butylcyclohexanol, isohexylcyclohexanol and the like. The hydroaromatic compounds may be made, for instance, by a catalytic nuclear hydrogenation of the aforesaid corresponding aromatic compounds.

These bodies may be caused to react, as stated above, with bodies which contain a reactive halogen atom, an oxygen-, nitrogen- or sulfur-bridge and an acid salt-forming radical. As example of such a body there has been mentioned the beta-chlordiethyl ether-beta'-sulfonic acid (Cl—CH₂—CH₂—O—CH₂—CH₂—SO₃H)

The new compounds may also be made in stages, for instance, by causing one of the said parent materials to react with a halogenhydrin or an alkylene oxide to form a product of the probable constitution:

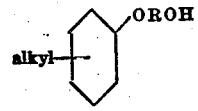

wherein R means an aliphatic hydrocarbon radical, and introducing in known manner an acid salt-forming group into the product obtained, for instance, by reaction with a halogen fatty-acid, by a half-side esterification with a dibasic aliphatic carboxylic acid, by introduction of radicals of polybasic oxygen containing mineral acids or by introducing a sulfonic acid group. Before introducing such an acid group it may be of advantage—in case a radical of a polybasic oxygen-containing mineral acid is introduced, it is necessary—to repeat, once or several times, the reaction with a halogen hydrin or an alkylene oxide whereby the intermediate products of the following probable constitution are obtained:

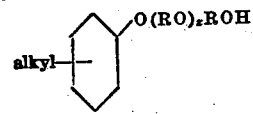

wherein R means an aliphatic hydrocarbon radical and $x$ means 1 or a higher whole number. By this sequence of reactions bodies are obtained in which the aliphatic radical carrying the acid group is interrupted at least once by oxygen. In an analogous manner there may be obtained bodies in which the said radical is interrupted by nitrogen or sulfur. For instance, an alkylphenol or an oxalkylated phenol may be esterified with thiodiglycolic acid, or an alkylated phenol is caused to react with a halogenalkyl-sulfonic acid, the corresponding sulfo-chloride manufactured therefrom is reduced to the sulfinic acid and halogen fatty acid is caused to react therewith, whereby bodies of the probable constitution:

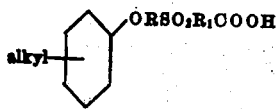

are obtained.

In the form of their water-soluble salts the new acid compounds possess a considerable capacity for reducing surface tension, so that they may be used with special advantage in the textile industry, for instance as wetting, emulsifying, dispersing and cleansing agents as well as in the leather industry and in all cases where substances capable of reducing surface tension are required. Some of the said compounds may also be used in the pharmaceutical art.

The following examples serve to illustrate the invention, but they are not intended to limit it thereto; the parts are by weight:—

(1) 178 parts of para-isohexylphenol are dissolved in a solution of 40 parts of caustic soda in 630 parts of ethyl alcohol. 85 parts of glycolchlorhydrin are then added and the mixture is boiled under reflux, while stirring, for 8 hours. The whole is filtered and the alcohol is distilled; the oil obtained is purified by vacuum distillation, 222 parts of the para-isohexylphenylglycol ether thus obtained are added to a sodium ethylate solution which has been prepared from 23 parts of sodium and 475 parts of anhydrous ethyl alcohol. The mixture is then heated under reflux, while stirring for one hour. The alcohol is removed by distillation and, after addition of 147 parts of sodium chloracetate (95 per cent. strength) and 600 parts of xylene the mixture is heated under reflux for about 10 hours and the xylene is then distilled off. The crude product thus obtained is freed from small amounts of matter which is insoluble in water.

A solution of 0.5 gram of the sodium salt of this acid in 1 liter of water has the same cleansing effect on wool as has a solution of 2 grams of soap in 1 liter of water. By adding 2 grams of sodium carbonate to the solution, a washing liquor is obtained which in respect of its cotton cleansing action is far superior to a corresponding solution of soap.

The substance dissolves in dilute sodium carbonate solution to a clear solution. It may be supposed to have the following constitution:

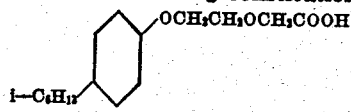

(2) At 140 C. to 150 C. there is introduced into 150 parts of para-isobutylphenol, to which 2 parts of caustic soda have been added, ethylene oxide until 88 parts thereof have been absorbed. By a subsequent washing with water and drying in a vacuum the mono-(para-isobutyl-phenyl)-diglycol ether of the formula:

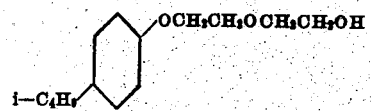

is obtained in the form of a thick liquid oil.

238 parts of this substance are caused to react, as described in Example 1, with 23 parts of sodium, 400 parts of absolute ethyl alcohol and 147 parts of sodium chloracetate of 95 per cent. strength in 500 parts of benzine, boiling at 140° C. to 170° C. There is obtained with a good yield a carboxylic acid which may be supposed to have the constitution:

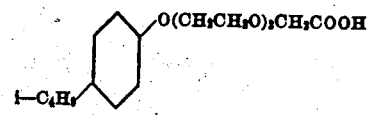

It is dissolves in sodium carbonate solution to a clear solution, and is capable of reducing surface tension. By using, instead of para-isobutylphenol, para-isobutylcyclohexanol, a corresponding carboxylic acid which may be supposed to have the following constitution:

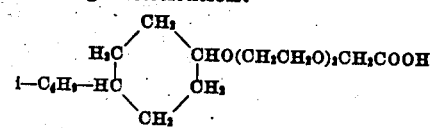

is easily obtained. The sodium salts of both carboxylic acids possess a very good wetting action in alkaline solution.

(3) 262 parts of para-isododecylphenol are etherified in the same manner as described in Example 1, with 115 parts of glycerol-chlorhydrin in the presence of 56 parts of caustic potash and 800 parts of ethyl alcohol. Subsequently 336 parts of the para-dodecylphenyl-dioxypropyl ether thus obtained are caused to react with 23 parts of sodium in the presence of 600 parts of methyl alcohol and the mixture, freed from the methyl alcohol, is heated together with 150 parts of the sodium salt of beta-chloropropionic acid (of about 95 per cent. strength) in the presence of 700 parts of toluene for 10 hours in an iron autoclave at 150° C. to 160° C. The carboxylic acid which is worked up in the manner described in Example 1 possesses, just as the aforesaid carboxylic acids, good capacity of reducing surface-tension and may be supposed to have the following constitution:

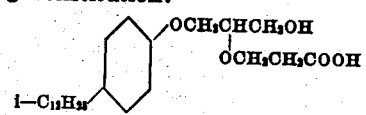

(4) From 356 parts of para-oleyl-ortho-cresol, 2 parts of caustic potash and 132 parts of ethylene oxide there is smoothly obtained according to the manner described in Example 2 mono-(para-oleyl-ortho-cresyl)-triglycol ether of the formula:

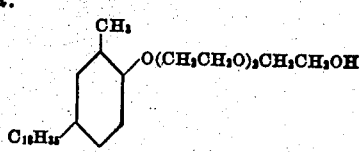

By a further treatment with 23 parts of sodium and 1300 parts of ethyl alcohol and, subsequently, with 147 parts of sodium chloracetate of 95 per cent. strength and 970 parts of decahydronaphthalene there is obtained with a good yield a carboxylic acid which may be supposed to have the following constitution:

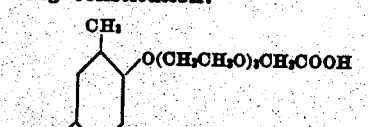

The ammonium salt of this acid is a very good olein emulsifying agent.

(5) 212 parts of para-isohexyl-ortho-chlorophenol are caused to react with 2 parts of caustic soda, 88 parts of ethylene oxide as described above. By treating the product with 54 parts of sodium ethylate, 147 parts of sodium chloracetate of 95 per cent. strength and 750 parts of xylene as described above, a carboxylic acid which may be supposed to have the constitution:

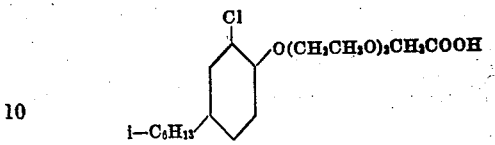

is obtained with a good yield; it is distinguished by good capacity of reducing surface tension. The product has also disinfecting properties:

(6) By starting from 240 parts of 1-iso-octyl-4-cyclohexyl-glycol ether, 23 parts of sodium, 400 parts of ethyl alcohol, 422 parts of the sodium salt of chlorethane-sulfonic acid of 50 per cent. strength and 1000 parts of xylene, there is obtained in the manner described in Example 2, with a good yield the sodium salt of a sulfonic acid which may be supposed to have the constitution:

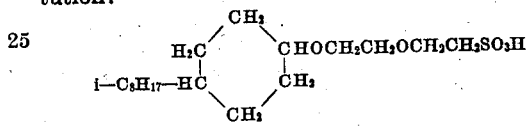

The product obtained is very well adapted for being used as a washing agent for animal and vegetable fibers.

By using for the reaction instead of the sodium salt of chlorethane-sulfonic acid, the sodium salt of chloracetic acid there is obtained the corresponding carboxylic acid or the sodium salt thereof. The free acid has the following constitution:

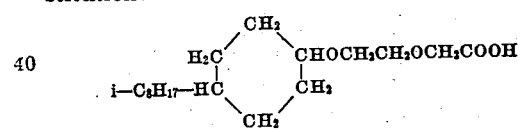

(7) 168 parts of ortho-benzylphenol are caused to react with 80 parts of ethylene chlorhydrin in the presence of the calculated quantity of alkali, to form the ortho-benzylphenylglycol ether.

212 parts of this ether are dissolved in 500 parts of xylene and 40 parts of pulverized sodium amide are gradually introduced. Thereupon, the whole is heated until the evolution of ammonia has ceased. 130 parts of sodium chloracetate are then added, the mixture is boiled for about 6-8 hours under reflux and the solvent is then distilled. From the residue, there is obtained the sodium salt of ortho-benzylphenyl-glycol ether-acetic acid of the formula:

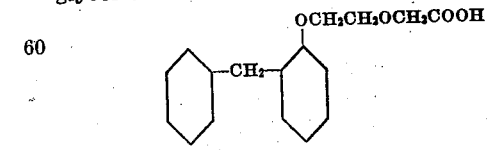

The sodium salt is easily soluble in water to a strongly frothing solution.

By starting from para-benzylphenol, the corresponding para-benzylphenylglycol ether-acetic acid, of the formula:

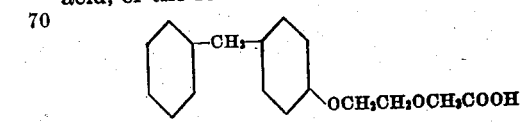

is obtained.

By causing ortho- or para-benzylphenol to react with 1 mol. of ethylene-sulfide, there is obtained the ortho- or para-benzylphenoxyethyl-hydrosulfide of the constitution:

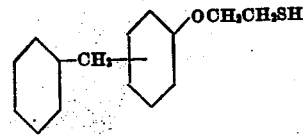

which may be caused, by procedure analogous to that described above, to react with chloracetic acid to form the ortho- or para-benzylphenoxy-ethylthioacetic acid of the formula:

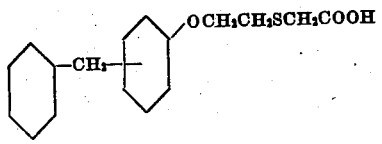

(8) 220 parts of para-isononylphenol are caused to react with 80 parts of ethylene chlorhydrin in known manner to form the para-isononylphenylglycol ether.

264 parts of this ether are dissolved in 500 parts of xylene and 42 parts of pulverized sodium amide are gradually introduced. Thereupon, the whole is heated until the evolution of ammonia has ceased. 130 parts of sodium chloracetate are then added, the mixture is boiled for about 6 to 8 hours under reflux. After distillation of the solvent there is obtained the sodium salt of para-isononyl-phenylglycol ether acetic acid. It is easily soluble in water to a strongly frothing solution. The free acid has the following formula:

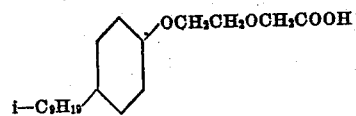

By causing nonylphenol to react with 1 mol. of ethylene sulfide, there is obtained the nonyl-phenoxyethylhydrosulfide of the constitution:

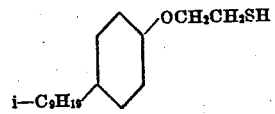

which may be caused, by procedure analogous to that described above, to react with sodium chloracetate to form the nonylphenoxyethyl-thioacetic acid of the following constitution:

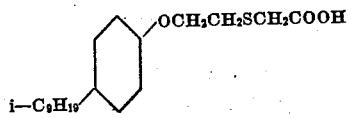

(9) 262 parts of para-n-dodecylphenol, prepared by transforming the phenyl ester of lauric acid into the para-laurophenone by the displacement method of Fries and reducing the ketone, are heated with 45 parts of ethylenemine in a closed vessel to about 100° C. to 120° C. After a short time, the reaction is at an end and the para-dodecyphenoxyethylamine is obtained.

300 parts of this amine are heated with 250 parts of sodium chloracetate in the presence of an agent binding hydrochloric acid, whereby, after a short time, the para-n-dodecylphenoxyethyl-iminodiacetic acid of the following formula:

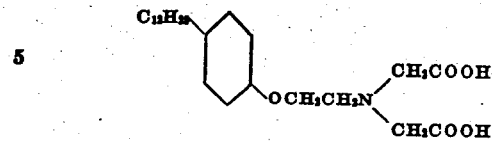

is formed.

By using, instead of the chloracetic acid, the equivalent amount of chlorethanesulfonic acid in the form of its sodium salt, there is obtained preferably while applying pressure, the para-n-dodecylphenoxyethyliminodiethanesulfonic acid of the following formula:

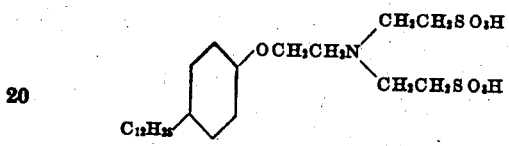

(10) 352 parts of a mixture of the alkylphenols, prepared by causing hardened fish oil fatty acid to react with phenol in the presence of borotrifluoride and reducing the ketonic mixture to the alkylphenol mixture, are dissolved in the calculated amount of alcoholic caustic potash solution and boiled for several hours under reflux with 220 parts of sodium beta-chlordiethylether-beta'-sulfonate. The whole is filtered in order to eliminate the separated potassium chloride. After elimination of the alcohol there remains the mixture of the sodium salts of the new alkylphenoxy-glycoletherethanesulfonic acid.

(11) 182 parts of octylphenol are dissolved in the calculated amount of alcoholic caustic potash solution and heated to boiling under reflux. An aqueous alcoholic solution of 210 parts of sodium beta-chlorethylether-beta'-sulfonate is slowly run into the boiling phenol solution. After combination of the two solutions, the whole is boiled for 5 to 6 hours under reflux. After cooling, the sodium octylphenoxyethoxyethanesulfonate has formed and may be separated from the solvent by filtering with suction.

The product forms a feebly yellow-brown powder which dissolves in water to a clear solution; its solutions have a high frothing power. The free acid has the following formula:

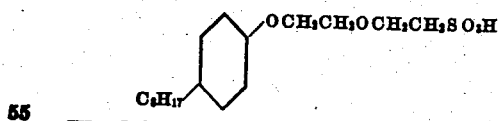

We claim:
1. The compounds of the general formula:

$$RO R_1 X$$

wherein R represents a member of the group consisting of aromatic and hydroaromatic radicals being substituted at least once by a member of the group consisting of aliphatic and aliphatic-aromatic radicals with more than 3 carbon atoms, $R_1$ represents an aliphatic radical the carbon chain of which is interrupted at least once by a member of the group consisting of oxygen, nitrogen and sulfur and X means an acid salt-forming group, which in the form of their water-soluble salts possess capillary activity.

2. The compounds of the general formula:

$$RO R_1 X$$

wherein R represents a member of the group consisting of aromatic and hydroaromatic radicals being substituted at least once by a member of the group consisting of aliphatic and aliphatic-aromatic radicals with more than 3 carbon atoms, $R_1$ represents a carbon chain which is interrupted by a member of the group consisting of oxygen, sulfur and nitrogen, X means a member of the group consisting of COOH and $SO_3H$, which in the form of their water-soluble salts possess capillary activity.

3. The compounds of the general formula:

$$RO(R_2O)_n R_3 COOH$$

wherein R represents a six-membered carbocyclic radical being substituted at least once by an aliphatic hydrocarbon radical with more than 3 carbon atoms, $R_2$ represents an aliphatic hydrocarbon radical with at least 2 carbon atoms, $R_3$ represents an aliphatic hydrocarbon radical and n means a whole number, which in the form of their water-soluble salts possess capillary activity.

4. The para-isohexyl-phenoxy-ethoxy-acetic acid of the formula:

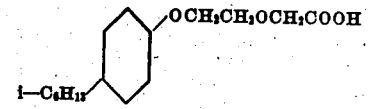

the water-soluble salts of which are of capillary activity.

5. The para-isooctyl-cyclohexylglycolether-acetic acid of the formula:

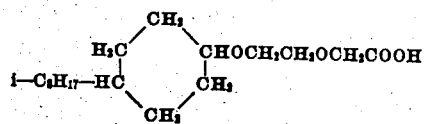

the water-soluble salts of which are of capillary activity.

6. The compound of the formula:

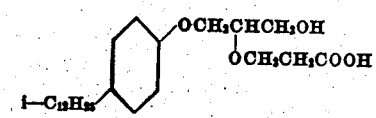

the water-soluble salts of which are of capillary activity.

ADOLF STEINDORFF.
GERHARD BALLE.
PAUL HEIMKE.
KARL HORST.